United States Patent Office 3,574,139
Patented Apr. 6, 1971

3,574,139
ORGANOALUMINUM HALIDE-COBALT/BIS-PHOSPHINE COMPLEX CATALYSTS
Robert Junior Harder, Wilmington, Del., assignor to E. I. du Pont de Nemours and Company, Wilmington, Del.
No Drawing. Filed Sept. 12, 1966, Ser. No. 578,477
Int. Cl. C07c *11/12*
U.S. Cl. 252—431          1 Claim

ABSTRACT OF THE DISCLOSURE

Cis-1,4-hexadiene is prepared by reacting ethylene with butadiene in the presence of a catalyst prepared by mixing bis[ethylenebis(diphenylphosphine)]cobalt (0) or bis[ethylenebis(diphenylphosphine)]cobalt (I) hydride with isobutylalauminum dichloride.

---

This invention relates to a process for making open-chained 1,4-dienes from α-monoolefins and conjugated dienes in the presence of a novel catalyst. More particularly it relates to the use of a new organoaluminum halide-cobalt-bisphosphine catalyst in preparing open-chained 1,4-dienes from α-monoolefins and conjugated dienes.

Alpha-olefin elastomers are of increasing importance today. Particularly valuable are the copolymers containing sulfur-curable side-chain unsaturation resulting from incorporation of non-conjugated units. U.S. Patent 2,933,480 to Gresham et al., describes representative copolymers of this type. Non-conjugated dienes useful in making these copolymers include 1,4-hexadiene itself and derivatives wherein the monomer still has one terminal vinyl group, e.g., 4-methyl-1,4-hexadiene. Other 1,4-diene containing elastomers are also important, for example, the copolymer prepared by copolymerizing isobutylene with 2-alkyl-1,4-hexadienes in the presence of a cationic catalyst, e.g., a Friedel-Crafts catalyst such as boron trifluoride or stannic chloride-water.

Because of the great utility of open-chain 1,4-dienes in making elastomers of the type discussed and in other areas, there has been a need for a catalyst system of sufficient activity to permit preparation of these dienes from α-monoolefins and conjugated dienes in an effective and economical manner.

It has been discovered that open-chain aliphatic 1,4-dienes may be effectively prepared by reacting an α-monoolefin with a conjugated diene in the presence of a catalyst prepared by mixing an organoaluminum halide and a cobalt-bisphosphine complex.

Ethylene is the preferred monoolefin for use in the present invention, being commercially available in large quantities at a very low price and, importantly, capable of combining with a conjugated diene to give a 1,4-diene having a terminal carbon-carbon double bond well suited for the reaction with coordination catalysts. Other α-monoolefins which may be used in this invention are those having the formula R—CH$_2$—CH=CH$_2$ where R is hydrogen, C$_1$-C$_{15}$ alkyl or halogenated C$_1$-C$_{15}$ alkyl. Of this group the commercially available members having up to about 6 carbon atoms are preferred; propylene is the most preferred because of its availability and the importance of the dienes formed when it is used. A preferred example of the halogenated alpha-monoolefin is 5,6-dibromo-1-hexene. Other examples of hydrocarbons and halogenated hydrocarbon alpha-monoolefins suitable for use in the present invention are given in U.S. Patent 3,222,330 to Nyce et al.

The conjugated dienes which may be used in this invention are those having the formula:

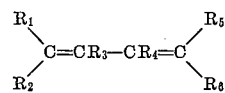

wherein R$_1$ and R$_5$ are tolyl, halophenyl, phenyl, alkyl, or hydrogen; R$_2$ and R$_6$ are alkyl or hydrogen and R$_3$ and R$_4$ are hydrogen, alkyl, aryl, alkaryl, aralkyl, or halo. The preferred conjugated diene for use in the present invention is 1,3-butadiene; it is commercially available in large quantities at an attractive price and when combined with ethylene, makes possible the preparation of 1,4-hexadiene which is a monomer particularly preferred for use in preparing sulfur curable hydrocarbon elastomers by coordination catalysis. Other conjugated dienes which are useful in the present invention include isoprene, 1,3-pentadiene; 2,4-hexadiene; 2,3-dimethyl-1,3-butadiene; 2-chloro-1,3-butadiene (chloroprene); 2,3-dichloro-1,3-butadiene; 1-phenyl-1,3-butadiene; 2-phenyl-1,3-butadiene; 1-p-tolyl-butadiene; 1,2-diphenyl-1,3-butadiene; 2,3-diphenyl-1,3-butadiene; 2-ethyl-1-phenyl-1,3-butadiene and 1-p-chlorophenyl-1,3-butadiene.

Although the reaction desired involves the equimolecular addition of an alpha-monoolefin to a conjugated diene, it is not necessary to employ approximately equimolar amounts of reactants. In typical batch operations the ratio of reactants may be continually changing. Both the alpha-monoolefin and the conjugated diene may be introduced into the reactor to establish a suitable value of the ratio before the reaction is initiated; thereafter additional alpha-monoolefin is fed therein during the course of the reaction until the desired conversion of the conjugated diene to the 1,4-diene is obtained. One or both of the reactants may be charged to the reaction vessel, continuously or intermittently during the reaction. In a preferred process, ethylene is maintained at essentially a constant pressure over the diene solution until consumption of ethylene ceases. The proportions of reactants to be used in a given reaction may be routinely determined by one skilled in the art with reference to the examples which follow.

The process of the present invention is carried out by contacting a mixture of the above-described monomers with a catalyst prepared by mixing an organoaluminum halide, and a cobalt-bisphosphine complex.

A wide variety of organoaluminum halides or mixtures thereof can be employed in the present invention. Suitable classes include diorganoaluminum monohalide, organoaluminum dihalide, and organoaluminum sesquihalide. The organic group may be varied widely and includes alkyl, aryl, aralkyl, and alkaryl radicals. The molecular weight of the organoaluminum halide is not critical; in general practice there is usually no practical advantage in employing compounds wherein the individual organic groups have more than 18 carbon atoms. The preferred compounds are diisobutylaluminum monochloride and diethylaluminum monochloride because of the faster rate of reaction which they induce and their ready availability. Isobutyl aluminum dichloride and ethylaluminum sesquihalide are also particularly important in this invention. Other representative alkyl, aryl, aralkyl, and alkaryl aluminum compounds include: diethyl aluminum bromide: isobutyl aluminum dibromide; diisopropyl aluminum monochloride; di-n-hexyl aluminum monochloride; di-n-amyl aluminum monochloride; isopropyl aluminum dichloride; diphenyl aluminum monochloride; bis(p-tolyl)aluminum monochloride; bis(p - chlorophenyl) aluminum monochloride; bis(3,4-dichlorophenyl)aluminum monochloride; bis(p-fluorophenyl)-aluminum monochloride; and dibenzyl aluminum monochloride. Similar compounds containing condensed aromatic rings are also suitable as are compounds containing substituted aromatic rings in which the substituents do not interfere with catalysts under the conditions employed.

The aluminum compound is added in amounts such that there are at least 2 aluminum atoms for each cobalt atom in the catalyst. Greater amounts of aluminum up to 200 atoms per cobalt atom may be used but are not economical. A preferred ratio is about 5–15 atoms of aluminum per atom of cobalt. Aluminum present in this quantity is commercially feasible and gives excellent reaction rates.

A wide variety of cobalt-bisphosphine complexes can be used in this invention in which the cobalt atom is in the (1) or (0) valence state.

The complexes are selected from the group consisting of cobalt hydride-bisphosphine complexes

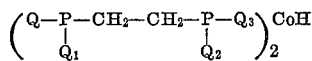

and Co(0) bisphosphine complexes,

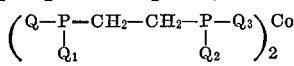

The Q groups of the cobalt monohydride-bisphosphine are selected from the group consisting of alkyl, cycloalkyl, aryl and aralkyl with the proviso that not more than two of the Q groups be methyl. The Q groups of the Co(0) bisphosphine are aryl. The preferred bisphosphine for use in both types of complexes is ethylenebis[diphenylphosphine]; catalysts in which it is present induce particularly good rates of reaction and give high yields of the 1,4-diene. Other representative bisphosphines used in making the cobalt hydride complexes include: ethylenebis[ethyl phenylphosphine]; ethylenebis[methyl phenylphosphine]; ethylenebis[benzyl phenylphosphine]; ethylenebis[dibenzylphosphine]; ethylenebis[dicyclohexylphosphine]; ethylenebis[diethylphosphine]; and ethylenebis[dihexylphosphine].

The cobalt (0) arylbisphosphine complexes may be made by the method of A. Sacco et al. in Chem. Commun. 1965, p. 602. The cobalt (I) hydride-arylbisphosphine complexes may be prepared by the general procedure of A. Sacco and Ugo given in the Journal of the Chemical Society of London, page 3274 (1964). The cobalt (I) hydridealkylbisphosphine complexes may be made by the method of Zingales et al., Inorg. Chem., vol. 2, p. 1303; (December 1963). The cobalt (I) hydride alkyl arylbisphosphine complexes may be prepared by either of the latter two processes.

The catalyst components are mixed together in a liquid medium; usually the hereinafter described inert organic diluent in which the reaction is carried out. The order is not critical and allows for a variety of procedures to be used at the convenience of one skilled in the art. For example, the organoaluminum halide may be added to the cobalt complex at various stages before or after the alpha-monoolefin and diene are present.

The preparation of the catalyst and its use in effecting the formation of 1,4-dienes from alpha-olefins and conjugated dienes can be carried out over a wide range of temperatures. Values varying from about 25° C. to about 120° C. can be used. At temperatures below about 80° C. the rate may slow down too much for operating convenience. The preferred temperature range lies between 80 and 120° C., about 90–100° C. being particularly preferred for practical operation and good rates of reaction.

The proportion of the catalyst in the monomer reaction zone can be varied widely. For economic reasons, it is desirable to use as little catalyst as possible consistent with a reasonable rate; a lower limit being at least about .001 millimole of the cobalt complex per mole of diene used. Typical proportions are illustrated by the examples which follow, though proportions outside these ranges can be employed, if desired. Those skilled in the art can determine the optimum amount of a particular catalyst for a particular set of monomers by routine experiments.

The pressure employed will vary with the volatility of the monomers used and the reaction temperature selected. A practical range of pressures for generally available reactors is from about 50 to about 1000 p.s.i.g.

The reaction is carried out in an inert organic diluent. By "inert" 'it is meant that the diluent will not deactivate the catalyst; thus it is free from impurities such as alcohol and water and it does not contain groups bearing Zerewitinoff-active hydrogen atoms, for example, hydroxyl groups, carboxyl groups, and the like. For optimum yields, the diluent should not undergo side-reactions with the catalyst, the monomers, or the 1,4-diene products. If it is desired to isolate the 1,4-diene from the reaction mixture, it is preferable that the diluent be easily separable; the boiling point of the diluent should thus be different enough from that of the diene product to afford convenient fractionation. Representative suitable diluents include: tetrachloroethylene, methylene chloride, chlorobenzene, aromatic hydrocarbons such as benzene, and toluene; and aliphatic and cycloaliphatic hydrocarbons such as hexane and decalin respectively. The greatest catalyst activity has been observed to occur in chlorinated hydrocarbons. It is believed that any diluent useful for conducting the coordination catalyzed polymerization of hydrocarbon monomers can be used here. The conjugated diene, for example 1,3-butadiene, itself, can serve as the diluent. In order to operate at temperatures at which product formation takes place at a convenient rate, it may be necessary to maintain superatmospheric pressure to liquify the diene.

Purification of the diluent and monomers can be carried out by the procedures familiar to those skilled in the art of coordination catalysis where organoaluminum compounds are involved. Oxygen should be excluded from the reaction system along with the above-named solvent impurities. Optionally, the reaction is stopped by adding a minimal amount of Zerewitinoff active hydrogen compound, frequently a low molecular weight alcohol such as isopropanol, to deactivate the catalyst. In any case gases are let off and the liquid directly distilled, the 1,4-diene being separated by fractionation. Representative procedures are given in the examples which follow.

The 1,4-diene can be prepared by the process of the present invention in a batch reactor or in a continuous reactor. The residence time for the continuous reaction is selected to carry out the desired conversion to 1,4-diene and may vary widely. The reaction mixture which continually overflows from the continuous reaction zone is treated by suitable continuous or batch purification and fractionation procedures to yield the 1,4-diene, the catalyst being recycled for reuse when desired.

The invention will now be illustrated by the following examples wherein parts are by weight unless otherwise indicated. As will be apparent from these examples, the novel catalysts of this invention are very active and make possible the synthesis of important 1,4-dienes in greater yield and less time than was heretofore possible.

Following is a summary of the components used in the various reactions in the examples indicated in parentheses.

Alpha monoolefins: Ethylene (1–10).

Conjugated dienes: 1,3-butadiene (1–3, 5, 6, 9, 10) 2 - methyl-1,3-butadiene (4); 2,3-dimethyl-1,3-butadiene (7, 8).

Solvents: Benzene (7, 8); toluene (1–6, 10) Decalin (9).

Aluminum compounds: diisobutyl aluminum monochloride (10); isobutyl aluminum dichloride (1–9).

Cobalt compounds and bisphosphines: bis[ethylene-bis(diphenylphosphine)] cobalt (I) hydride (1–4, 6–9, 10); bis[ethylenebis(diphenylphosphine)] cobalt (0) (5).

Aluminum/cobalt atomic ratio: 6/1 (1, 2, 5–9 and 10); 7/1 (3, 4).

Molecules of bisphosphine/cobalt atom ratio: 2/1 (1–10).

In all of the examples the catalyst is present in such proportions that there is at least .001 millimole of the cobalt complex per mole of conjugated diene.

EXAMPLE 1

A 1.9-liter stirred autoclave is flushed with nitrogen and charged with 500 ml. of dry, nitrogen-purged toluene and 0.6 gram (0.68 millimole) of bis[ethylenebis-(diphenylphosphine)] cobalt (I) hydride,

(prepared according to the method of Sacco and Ugo, J. Chem. Soc. 1964, 3274). The autoclave is cooled, and 100 grams (1.85 moles) of 1,3-butadiene are added by distillation. Ethylene is then added at 10° C. until the pressure is 40 pounds per square inch, whereupon the reaction mixture is heated at 85° C. for forty minutes and then cooled to 15° C. The ethylene pressure is increased to eighty pounds per square inch. Four milliliters of a molar solution of monoisobutylaluminum dichloride in tetrachloroethylene are added, and the mixture stirred at room temperature for thirty minutes. One milliliter of isopropanol is added, the gases are vented off, and the 625 ml. of liquid remaining is distilled at atmospheric pressure, giving 4.5 g. of a fraction, B.P. 58–75° C., containing approximately 4 g. of cis-1,4-hexadiene.

EXAMPLE 2

A 1.9 liter stirred autoclave is flushed with nitrogen and charged with 500 ml. of dry, nitrogen-purged toluene and 0.90 gram (1 millimole) of bis[ethylenebis(diphenylphosphine)]cobalt (I) hydride, prepared as in Example 1. The autoclave is cooled, 100 grams (1.85 moles) of 1,3-butadiene distilled in, and ethylene added at 13° C. until the pressure is 40 pounds per square inch. Then, 6 milliliters of a molar solution of monoisobutylaluminum dichloride in tetrachloroethylene are added. The mixture is stirred for 1.5 hours at 24–27° C., the ethylene pressure being increased to 105 p.s.i. during this time; 3 milliliters of isopropanol are added, and the gases vented. The 610 ml. of liquid remaining are distilled at atmospheric pressure, giving 3.5 grams of a fraction, B.P. 72–79° C., containing approximately one gram of cis-1,4-hexadiene.

EXAMPLE 3

A 1.9-liter stirred autoclave is flushed with nitrogen and charged with 500 ml. of dry, nitrogen-purged toluene and 0.50 g. (0.57 mole) of bis[ethylenebis(diphenylphosphine)] cobalt (I) hydride, prepared as in Example 1. The autoclave is cooled, 87 grams (1.6 moles) of 1,3-butadiene distilled in, and ethylene added at 15° C. until the pressure is 40 pounds per square inch. Then 3.5 milliliters of a molar solution of monoisobutylaluminum dichloride in tetrachloroethylene are added. The mixture is stirred at room temperature for 15 minutes and then heated at 85° C. for 70 minutes, ethylene being added continuously to maintain the pressure at 77–90 pounds per square inch. One milliliter of isopropanol is added, the reaction mixture cooled to room temperature and the gases vented. The 670 milliliters of liquid remaining are distilled at atmospheric pressure, giving approximately 100 g. of a fraction B.P. 62.5–67.0, $n_D^{25}$ 1.4130, consisting nearly entirely of cis-1,4-hexadiene.

EXAMPLE 4

The autoclave is charged as in Example 3 except that in place of 1,3-butadiene, 120 milliliters (80 g., 1.2 mole) of dry, nitrogen-purged isoprene are added. The mixture is heated to 85° C. during one-half hour and held at 85–88° C. for two hours, ethylene being added continuously to maintain a pressure of 67–74 pounds per square inch. One milliliter of isopropanol is added, the mixture cooled and the reactor vented. The 615 milliliters of liquid remaining are distilled at atmospheric pressure, giving a fraction, B.P. 92–93.5° C., weighing 21.6 grams, consisting mainly of a mixture of methylsubstituted 1,4-hexadienes. The major component is shown by mass spectral analysis, gas chromatography and n-m-r proton spectroscopy to be 4-methyl-1,4-hexadiene. 5-methyl-1,4-hexadiene is also present.

EXAMPLE 5

A 1.9-liter stirred autoclave is flushed with nitrogen and charged with 500 ml. of dry, nitrogen-purged toluene, 0.9 gram (1 millimole) of bis[ethylenebis(diphenylphosphine)]cobalt (0),

prepared according to the method of A. Sacco and M. Rossi (Chem. Commun. 1965, 602). The autoclave is cooled and 96 grams (1.8 moles) of 1,3-butadiene distilled in. Ethylene is added at 15° C. until the pressure is 40 pounds per square inch. Then 6 milliliters of a molar solution of monoisobutylaluminum dichloride in tetrachloroethylene are added, and the mixture is heated at 86–90° C. for 45 minutes, ethylene being added continuously to maintain a pressure of 88–92 pounds per square inch. Two milliliters of isopropanol are added, the mixture cooled to room temperature and the gases vented. The 615 ml. of liquid remaining are distilled at atmospheric pressure giving 12 g. of cis-1,4-hexadiene, B.P. 64–66.5° C., $n_D^{25}$ 1.4123.

EXAMPLE 6

A 1.9-liter stirred autoclave is flushed with nitrogen and charged with 500 ml. of toluene and 0.6 gram (0.68 millimole) of bis[ethylenebis(diphenylphosphine)]cobalt (I) hydride. The autoclave is cooled, and 103 grams (1.9 moles) of 1,3-butadiene is distilled in. Ethylene is then added at 15° C. until the pressure is 40 pounds per square inch whereupon 4.1 ml. of a molar solution of monoisobutylaluminum dichloride in tetrachloroethylene are added. The mixture is heated at 83–90° C. for one hour, ethylene being added as required to maintain a pressure of 76–84 p.s.i., and then it is cooled and vented. After more 1,3-butadiene (100 grams, 1.85 moles) has been added, the autoclave is repressured with ethylene and heated at 80–87° for one hour and fifteen minutes, ethylene being added as required to maintain a pressure of 58–65 p.s.i. After cooling and venting of gases is again done, 97 grams (1.8 moles) of 1,3-butadiene and further ethylene are introduced. The autoclave is heated at 92–95° C. for one hour, ethylene being supplied as required to maintain a pressure of 59–81 p.s.i. Finally, 1 milliliter of isopropanol is added, the autoclave is cooled and the gases are vented. The 100 milliliter residue of liquid is distilled at atmospheric pressure, giving 367 grams (80% conversion) of cis-1,4-hexadiene, B.P. 64–67° C., $n_D^{25}$ 1.4122.

EXAMPLE 7

A 1.9-liter stirred autoclave is flushed with nitrogen and charged with 500 ml. of dry, nitrogen-purged benzene, 0.6 gram (0.68 millimole) of bis[ethylenebis(diphenylphosphine] cobalt (1) hydride, and 70 grams (0.85 mole) of dry, nitrogen-purged 2,3-dimethyl-1,3-butadiene. Ethylene is added at 15° C. until the pressure is 40 pounds per square inch; 4.1 milliliters of a molar solution of monoisobutylaluminum dichloride in tetrachloroethylene are then introduced. The mixture is held at 25° C. for 20 minutes and then heated at 82–90° C. for one-half hour, ethylene being supplied continuously to maintain a pressure of 66–92 pounds per square inch. One milliliter of isopropanol is added, the mixture cooled, and the gases vented. Gas chromatography of the liquid remaining indicates the presence of 4,5-dimethyl-1,4-hexadiene.

EXAMPLE 8

A 1.9-liter stirred autoclave is flushed with nitrogen and charged with 350 ml. of dry, nitrogen-purged benzene, 0.9 gram (1 millimole) of bis[ethylenebis(diphenylphosphine)] cobalt (I) hydride and 83 grams (1 mole) of nitrogen-purged 2,3-dimethyl-1,3-butadiene. Then, 6.1 milliliters of a molar solution of monoisobutylaluminum dichloride in tetrachloroethylene are added. Ethylene is introduced until the pressure is 40 pounds per square inch. The mixture is heated at 87–94° C. for 2 hours and 20 minutes, ethylene being added continuously to maintain a pressure of 60–86 pounds per square inch. The mixture is cooled to room temperature, 2 milliliters of isopropanol are added, the gases are vented, and the 485 ml. of liquid remaining is distilled at atmospheric pressure. A fraction, 42 grams, B.P. 117.0–117.5° C., $n_D^{25}$ 1.4428, is identified as 4,5-dimethyl-1,4-hexadiene by its n-m-r proton spectrum.

EXAMPLE 9

A 1.9-liter stirred autoclave is flushed with nitrogen and charged with 350 ml. of dry, nitrogen-purged decahydronaphthalene and 0.6 gram (0.68 millimole) of bis[ethylenebis(diphenylphosphine)] cobalt (I) hydride. The autoclave is cooled, and 97 grams (1.8 moles) of 1,3-butadiene is added by distillation. Ethylene is introduced at 65° C. until the pressure is 40 pounds per square inch. Then, 4.1 milliliters of a molar solution of monoisobutylaluminum dichloride in tetrachloroethylene are added, and the mixture is heated at 85–92° C. for 20 minutes, ethylene being added continuously to maintain a pressure of 75–80 pounds per square inch. When the mixture has been subsequently cooled to room temperature and the gases vented, 99 grams (1.8 moles) of 1,3-butadiene are added to the autoclave. The mixture is heated at 85–93° C. for 45 minutes, ethylene being added continuously to maintain a pressure of 68–82 pounds per square inch. When the mixture has again been cooled to room temperature and the gases vented, 100 grams (1.85 moles) of 1,3-butadiene are added. The mixture is then heated at 82–95° C. for 25 minutes, ethylene being added continuously to maintain a pressure of 76–81 pounds per square inch. Finally, the mixture is cooled to room temperature, 1 milliliter of isopropanol is added, and the gases are vented. The 850 milliliters of liquid remaining is distilled at atmospheric pressure, giving 280 grams (62% conversion) of cis-1,4-hexadiene, B.P. 64–67° C., $n_D^{25}$ 1.4125.

EXAMPLE 10

A 1.9-liter stirred autoclave is flushed with nitrogen and charged with 400 ml. of dry, nitrogen-purged toluene and 0.6 gram (0.68 millimole) of bis[ethylenebis(diphenylphosphine)] cobalt (I) hydride. The autoclave is cooled, and 129 grams (2.4 moles) of 1,3-butadiene are added by distillation. Then 4.1 milliliters of a one molar solution of diisobutylaluminum chloride in tetrachloroethylene are added at 15° C. Ethylene is added at 15° C. until the pressure in the autoclave is 40 pounds per square inch. After being held at room temperature for 20 minutes, the mixture is heated at 80–85° C. for 25 minutes, sufficient ethylene being added to maintain a pressure of 80 pounds per square inch. The mixture is cooled and treated with one milliliter of isopropanol and the gases vented off. The 665 milliliters of liquid remaining is distilled at atmospheric pressure, giving 137 grams of cis-1,4-hexadiene, B.P. 64.5–67.0° C., $n_D^{25}$ 1.4115.

What is claimed is:
1. An organoaluminum halide-cobalt-bisphosphine catalyst prepared by the process of mixing
   (A) an organoaluminum halide whose organic group is selected from: alkyl, aryl, alkaryl and aralkyl, and
   (B) a cobalt-bisphosphine complex which consists of 1 mole of cobalt (valence of zero) with 2 moles of ethylenebis (diphenylphosphine);
said halide and said complex being mixed in such proportions that there are at least 2 atoms of aluminum for each atom of cobalt in the catalyst.

References Cited
FOREIGN PATENTS 8,052  4/1966  Japan _____ 260—680(B)

PAUL M. COUGHLAN, JR., Primary Examiner

U.S. Cl. X.R.
260—680